3,412,142
ACRYLYL PERFLUOROHYDROXAMATES
Pier Luigi Pacini, Dobbs Ferry, N.Y., assignor to Geigy Chemical Corporation, Greenburgh, N.Y., a corporation of Delaware
No Drawing. Filed June 27, 1966, Ser. No. 560,853
6 Claims. (Cl. 260—500.5)

This invention relates to fluorine-containing monomers useful to prepare polymers with soil repellent properties. More particularly it relates to acrylyl perfluorohydroxamates. The new monomers provide polymers with oil- and water-repellent properties useful to treat materials such as textiles, paper, leather, painted wooden and metallic surfaces, and the like.

The perfluorinated compounds contemplated by the instant invention are those of the formula:

$$C_nF_{2n+1}-\overset{O}{\underset{}{C}}-\underset{R}{N}-O-\overset{O}{\underset{}{C}}-\overset{R_1}{\underset{}{C}}=CH_2$$

wherein $n$ is a whole number of from 1 to 18; R is hydrogen or alkyl of from 1 to 6 carbon atoms and $R_1$ is hydrogen or methyl. The $C_nF_{2n+1}$ radical may be straight or branched chain. Where used herein, "acrylyl" contemplates as well "methacrylyl."

Special mention is made of an especially valuable embodiment of this invention. This comprises compounds of the formula above wherein $n$ is a whole number of from 1 to 18, preferably from 7 to 15, and R and $R_1$ are hydrogen or methyl.

Especially useful as embodiments of this invention are the compounds methacrylyl perfluorooctanoylhydroxamate, a compound of the above formula in which the straight chain $C_nF_{2n+1}$ radical has a value for $n$ of 7, R is hydrogen and $R_1$ is methyl; methacrylyl N-methylperfluorooctanoylhydroxamate, a compound of the formula above wherein the straight chain $C_nF_{2n+1}$ radical has a value for $n$ of 7, and R and $R_1$ are methyl; and methacrylyl perfluorobutyrylhydroxamate, a compound of the formula above wherein the straight chain $C_nF_{2n+1}$ radical has a value for $n$ of 3, R is hydrogen and $R_1$ is methyl.

Polymers obtained from the new monomers are characterized by excellent resistance to hydrolysis. This provides substantial advantage in their use as fabric finishes, when compared to finishes previously used for the purpose of soil repellency. Fabrics finished with polymers made from the instant monomer retain their soil-repellent properties after repeated washings.

The acrylyl perfluorohydroxamates of this invention form copolymers with many monomers containing an ethylenic linkage. Illustrative of such comonomers are butadiene, chloroprene, 1,1,2-trifluoro-1,3-butadiene, octyl acrylate, dodecyl methacrylate, vinyl chloride, and the like. Especially useful to form soil-repellent finishes are copolymers of methacrylyl perfluorooctanoylhydroxamate and octyl methacrylate.

The new perfluorinated compounds can be prepared from readily available materials according to the reaction outlined in the following sequence:

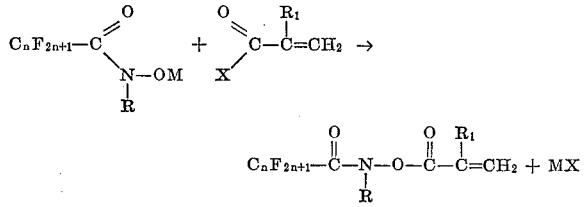

wherein $n$, R and $R_1$ are as above defined, and M is hydrogen or a replaceable metallic cation from Groups I and II of the periodic table such as sodium, potassium, calcium, magnesium, mercury, and the like, and X is halogen, such as chlorine or bromine. The condensation is effected merely by bringing together the perfluorohydroxamic acid salt and the acrylyl or substituted acrylyl halide. It is preferred to conduct the reaction in a solvent, suitably dry acetonitrile, and to heat the mixture at reflux for a short time to insure highest yields. The product is recovered by filtering off the by-product salt and evaporating the solvent, if any is used. The product, which remains as a residue, can be purified, if desired, by recrystallization from a chlorinated hydrocarbon solvent, such as cholorform or carbon tetrachloride, or it can be distilled in the presence of an inhibitor such as hydroquinone.

Alternatively, the instant acrylyl perfluorohydroxamates can be prepared by treating an appropriately-substituted perfluorohydroxamic acid with an acrylyl or methacrylyl halide in the presence of an acid binding agent, such as a base, like quinoline, which is capable of binding the elements of hydrogen halide eliminated as a by-product.

Alternatively and conveniently, the compounds of this invention wherein R is alkyl of up to 6 carbon atoms can be prepared by alkylation of the compounds wherein R is hydrogen. Thus, for example, the instant compounds wherein R is hydrogen are converted to a salt, such as the potassium salt, by treatment with a base such as potassium hydroxide. The said salt is reacted with an alkylating agent, such as an alkyl halide or a dialkyl sulfate until the reaction is substantially complete and the alkylated product is recovered by separating the by-product salt, then isolating the residue, purifying it, if necessary, by crystallization or distillation, as described above and exemplified hereinafter.

The starting materials are readily available or can be prepared by techniques within the capabilities of those skilled in the art. Perfluorohydroxamic acids and salts, for example, can be prepared by simple modifications of the procedures reviewed by Yale in Chem. Reviews, 33, 209 (1943). The acrylyl and methacrylyl halides are items of commerce or can be obtained, for example, by the procedures described in the literature of the art to which the present invention pertains.

The starting materials which are used in this invention are perfluorohydroxamic acids or metal derivatives thereof and can be prepared, for example, by mixing an appropriate ester or acyl halide, such as the chloride, of a perfluoroalkane carboxylic acid with an appropriately-substituted hydroxylamine salt, such as hydroxylamine hydrochloride or an alkylhydroxylamine hydrochloride, and the like, in a solution of dry alcohol, such as methanol and in the presence of a metal hydroxide, such as sodium hydroxide or potassium hydroxide. The mixture is stirred until the replacement of alkoxy group in the ester by the hydroxylamino group is substantially complete, which requires from about 30 minutes to about 4 days, depending on the reactivity of the reagents and the temperature of the mixture. The starting material is recovered by filtering off the by-product salt, then adding enough chloroform to precipitate the metal derivative of perfluoroalkylhydroxamic acid from solution. If the free acid is desired, the salt is treated with a strong acid, such as hydrochloric acid and the free acid precipitates and is recovered by filtration.

Starting materials of Formula II are contemplated by this invention:

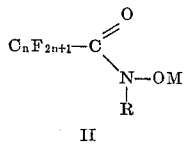

wherein $n$ is a whole number from 2 to 18 and R and M are as defined above.

Homopolymers and copolymers of the instant monomers are formed by standard procedures well known to those skilled in the art. Polymerization occurs readily by bulk, solution or emulsion techniques, employing free radical-forming catalysts. The ratios of percentages by weight of the respective monomers used can vary widely in the formation of useful copolymers. For example, charge ratios of the instant acrylyl perfluorohydroxamate monomers may vary from 1 to 99% by weight of the total monomer mixture. It is preferred however, for the best balance of economy and ultimate properties, to use between about 40 and about 90% by weight of the instant monomers based on the total monomer mixture. Suitable techniques for preparing especially useful copolymers from the instant monomers are derived from and substantially the same as those shown in Bolstad, Sherman and Smith, U.S. 3,068,187.

Films of the homopolymers and copolymers can be prepared by casting from solvent solutions. Especially useful as solvents are fluorinated liquids, and special mention is made of $\alpha,\alpha,\alpha$-trifluorotoluene, also known as benzotrifluoride.

It is also uniquely advantageous, especially in the preparation of fabric finishes, to use blends of homopolymers of the instant monomers with other homopolymers such as alkyl acrylates and alkyl methacrylates, illustrative of which is n-octyl methacrylate. Since the homopolymers of certain of the acrylyl perfluorohydroxamates have a tendency to be brittle and high melting, blending them with, for example, from about 20 to about 97% by weight of a homopolymer such as poly-n-octyl methacrylate provides useful compositions which, surprisingly retain high repellency ratings even though the relative amount of polymer of the instant monomers is quite low.

The following examples are illustrative of the compounds of the instant invention. They are provided for purposes of exemplification and are not to be construed to limit the scope of the claims in any manner.

EXAMPLE I

Methacrylyl perfluorooctanoylhydroxamate

Potassium perfluorooctanoylhydroxamate (prepared by treating methyl perfluorooctanoate with hydroxylamine hydrochloride in the presence of potassium hydroxide), 23.35 g., 0.05 mole, is suspended in 150 ml. of dry acetonitrile. A solution of methacrylyl chloride, 7.31 g., 0.07 mole, in 20 ml of dry acetonitrile is added dropwise to the vigorously stirred mixture. The reaction is stirred for an additional 90 minutes at 25° C. and then refluxed for 15 minutes. The by-product potassium chloride is removed by filtration and the solvent is removed by distillation in a vacuum. The residue is recrystallized from a mixture of equal parts of chloroform and carbon tetrachloride. There is obtained 19.1 g. of product, M.P. 62–64° C.

EXAMPLE II

Methacrylyl perfluorobutyrylhydroxamate

A mixture of potassium perfluorobutyrylhydroxamate, 0.12 mole, and methacrylyl chloride, 0.12 mole, suspended in 120 ml. of dry acetonitrile is stirred at 25° C. for four hours. The reaction mixture then is filtered and the solvent is removed from the filtrate by distillation in a vacuum. A sample of the product polymerized spontaneously when left overnight at 25° C. A quick distillation of the filtrate in the presence of hydroquinone as polymerization inhibitor affords 12.2 g. of product, B.P. 65–66° C. at 0.05 mm. Hg pressure.

EXAMPLE III

Methacrylyl N-methylperfluorooctanoylhydroxamate

The potassium salt of methacrylyl perfluorooctanoylhydroxamate is prepared by neutralizing a solution of methacrylyl perfluorooctanoylhydroxamate in dioxane with an equivalent amount of potassium hydroxide dissolved in methanol. The salt, which precipitates immediately, is filtered and dried. A mixture of the potassium salt, 0.022 mole, suspended in 50 ml. of dry acetonitrile, and 0.026 mole of dimethyl sulfate, is allowed to reflux for 1 hour. After cooling to room temperature, the mixture is filtered and the solvent is removed from the filtrate by distillation in a vacuum. Distillation of the residue affords 6.7 g. of product, B.P. 79.5–80.5° C. at 0.05 mm. Hg pressure.

EXAMPLE IV

The procedure of Example I is repeated with stoichiometrically-equivalent amounts of perfluorohydroxamic acid derivatives and acrylyl and methacrylyl halides. The following substituted-acrylyl perfluorohydroxamates are obtained:

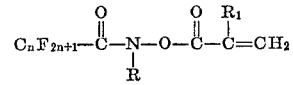

| $C_nF_{2n+1}$ | R | $R_1$ |
|---|---|---|
| $CF_3$ | H | $CH_3$ |
| $(CF_3)_2CF$ | $CH_3$ | H |
| $CF_3(CF_2)_6$ | $(CH_3)_2CH$ | $CH_3$ |
| $CF_3(CF_2)_{17}$ | H | $CH_3$ |
| $CF_3(CF_2)_{11}$ | $CH_3$ | $CH_3$ |
| $CF_3(CF_2)_6$ | $(CH_3)_3C$ | $CH_3$ |
| $CF_3(CF_2)_{10}$ | $CH_3(CH_2)_5$ | H |
| $CF_3(CF_2)_{10}$ | $CH_3CH_2$ | $CH_3$ |
| $CF_3(CF_2)_6$ | $CH_3$ | H |
| $(CF_3)_2CF(CF_2)_6$ | H | $CH_3$ |
| $(CF_3)_2CF[CF_2CF(CF_3)]_4$ | $CH_3$ | $CH_3$ |
| $CF_3[CF_2CF(CF_3)]_5$ | H | $CH_3$ |

What is claimed is:
1. A compound of the formula:

$$C_nF_{2n+1}-\overset{O}{\underset{}{C}}-N-O-\overset{O}{\underset{}{C}}-\overset{R_1}{\underset{}{C}}=CH_2$$
$$\hspace{3cm} | \hspace{2cm}$$
$$\hspace{3cm} R$$

wherein $n$ is a whole number of from 1 to 18
R is hydrogen or alkyl of from 1 to 6 carbon atoms; and
$R_1$ is hydrogen or methyl.

2. A compound as defined in claim 1 wherein $n$ is a whole number of from 1 to 18 and R and $R_1$ are hydrogen or methyl.

3. A compound as defined in claim 1 wherein $n$ is 7, R is hydrogen and $R_1$ is methyl.

4. A compound as defined in claim 1 wherein $n$ is 7, and R and $R_1$ are methyl.

5. A compound as defined in claim 1 wherein $n$ is 3, R is hydrogen and $R_1$ is methyl.

6. A compound of the formula:

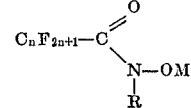

wherein $n$ is a whole number from 2 to 18, R is hydrogen or alkyl of from 1 to 6 carbon atoms and M is hydrogen or a replaceable metallic cation.

References Cited

UNITED STATES PATENTS 2,279,560   4/1942   Dietrich _____ 260—500.5
2,559,630   7/1951   Bullitt _____ 260—545
3,236,871   2/1966   Hinman et al. _____ 260—545

LEON ZITVER, *Primary Examiner.*

J. E. EVANS, *Assistant Examiner.*